United States Patent
Gleixner et al.

[11] Patent Number: 6,073,504
[45] Date of Patent: Jun. 13, 2000

[54] MOTOR/TRANSMISSION DRIVE UNIT FOR DRIVING A COMPONENT THAT IS MOVABLE BETWEEN END POSITIONS

[75] Inventors: Ronald Gleixner, Ochsenfurt; Peter Landwehr, Theilheim; Sabine Lang, Erlangen, all of Germany

[73] Assignee: Siemens Aktiengesellschaft, Munich, Germany

[21] Appl. No.: 09/021,575

[22] Filed: Feb. 10, 1998

Related U.S. Application Data

[63] Continuation of application No. PCT/EP96/03540, Aug. 9, 1996.

[30] Foreign Application Priority Data

Aug. 11, 1995 [EP] European Pat. Off. ............. 95112678

[51] Int. Cl.$^7$ ................. F16H 1/16; B60J 7/057
[52] U.S. Cl. ................. 74/89.14; 74/89.22; 74/625; 192/139; 296/223
[58] Field of Search ................. 74/625, 89.14, 74/425, 89.22, 545, 84 R, 436; 296/223; 192/138, 139, 143; 318/468

[56] References Cited

U.S. PATENT DOCUMENTS

| | | | |
|---|---|---|---|
| 3,478,616 | 11/1969 | Smith | 74/436 |
| 4,272,125 | 6/1981 | Bienert et al. | 296/223 |
| 4,420,185 | 12/1983 | Bienert et al. | 296/223 |
| 4,512,214 | 4/1985 | Surman | 74/436 |
| 4,665,764 | 5/1987 | Inoue et al. | 74/436 |
| 4,996,395 | 2/1991 | Tada | 296/223 |
| 5,101,684 | 4/1992 | Mosslacher | 296/223 |
| 5,181,891 | 1/1993 | Pohl et al. | 296/223 |
| 5,566,593 | 10/1996 | Vordermaier | 74/625 |

FOREIGN PATENT DOCUMENTS

| | | |
|---|---|---|
| 0410487 | 1/1991 | European Pat. Off. . |
| 2664643 | 1/1992 | France . |
| 0820357 | 9/1951 | Germany . |
| 4209652 | 4/1993 | Germany . |
| 4403574 | 1/1995 | Germany . |

*Primary Examiner*—David A. Bucci
*Assistant Examiner*—William C Joyce
*Attorney, Agent, or Firm*—Sughrue, Mion, Zinn, Macpeak & Seas, PLLC

[57] ABSTRACT

A drive unit provided with an end position recognition device includes a radially projecting cam (27) connected to a driveshaft (20) of the drive unit, for reducing the stroke travel of the unit. The radially projecting cam engages, from tooth to tooth, into the inner toothing of a ratchet wheel (110), rotatable about an axis of rotation (111) that is offset and parallel to an axis of the driveshaft (20). The end position recognition device can be retrofitted and is preferably capable of operating even in the case of emergency manual actuation. The cam (27) has a sufficient axial stroke lift such that, in the case of emergency manual actuation, it nonetheless meshes with the ratchet wheel (110) even when the driveshaft (20) is displaced axially.

32 Claims, 7 Drawing Sheets

MOTOR/TRANSMISSION DRIVE UNIT FOR DRIVING A COMPONENT THAT IS MOVABLE BETWEEN END POSITIONS

This is a Continuation of International Application PCT/EP96/03540, with an international filing date of Aug. 9, 1996, the disclosure of which is incorporated into this application by reference.

FIELD OF AND BACKGROUND OF THE INVENTION

The invention relates to a motor/transmission drive unit for a component movable between end positions. More particularly, the invention relates to a drive unit for driving an adjustable component such as a sliding roof in an automobile.

Motor/transmission drive units of the above-mentioned type require an end position recognition device, for switching the motor drive on and off when the adjustable component is in specific stroke positions, for example when the closing or opening end position of the component, e.g. the sliding roof of an automobile, is reached. For unequivocal recognition, the total stroke travel, which corresponds to a multiplicity of revolutions of the output shaft or drive shaft, must be converted, i.e. reduced by means of a reduction gear, into a maximum of one revolution of a countertakeup, or ratchet wheel, for actuating the motor switch.

German Patent DE-C1-42 09 652 discloses a drive device for a vehicle component adjustable between end positions. The electric motor of the drive device is connected via a reduction gear to a drive pinion which is seated on an output shaft and which is itself drive-connected to the adjustable component. Furthermore, the drive device includes a motor-controlling switching means for stopping the motor in at least one predetermined position of the adjustable component. A ratchet wheel for actuating the switching means is induced via an eccentric toothed gear to execute a rotational movement of less than 360° during the adjustment of the component between its end positions. The eccentric toothed gear has an internally toothed outer wheel and an externally toothed inner wheel which is in meshing engagement therewith. The inner wheel is stationary. The outer wheel is mounted for a wobbling movement with respect to the axis of the inner wheel and forms the ratchet wheel cooperating with the switching means.

In motor/transmission drive units of the above-mentioned type, it is often desirable to have the additional possibility of manually operated emergency actuation; however, this is not provided in the case of the device discussed above.

A crankhandle-operable emergency drive of a drive unit otherwise capable of being driven operatively by means of an electric motor, in particular for sliding roofs in automobiles, is described, for example, in European Patent Application EP-A2-0 410 487. In this conventional unit, a releasable coupling connection is provided between the transmission, on the one hand, and a driveshaft of the drive unit, on the other hand, via a positive rotary takeup device. The outer face of the emergency actuation component has, in addition to a cylindrical portion, an axially extending externally hexagonal portion. This hexagonal portion is positively received in a corresponding hexagonal axial recess of the output gearwheel and of the output shaft, so that in normal operation a positive connection exists between the output gearwheel and the output shaft via the emergency actuation component. In the case of an emergency manual actuation operation, the positive connection between the emergency actuation component and the output gearwheel is broken by pressing the emergency actuation component axially forward against a prestressed helical compression spring. An end position recognition device is not provided in this conventional unit, however.

OBJECTS OF THE INVENTION

One object of the present invention, therefore, is to provide an end position recognition device which is simple to manufacture and can advantageously be retrofitted to an existing motor transmission drive unit. Another object is to provide a device which, even when there is a manual emergency actuation, maintains the defined end positions during and after performance of the emergency actuation, so that normal operation can be resumed without the need for resetting the unit.

SUMMARY OF THE INVENTION

The above-mentioned objects are achieved by the motor transmission drive unit in accordance with the present invention.

The motor transmission drive unit according to one formulating the invention is provided for an adjustable component, such as the sliding roof of an automobile, and includes the following features:

an electric motor is drive-connected to a reduction gear comprising at least one output shaft and one driveshaft;

a takeup disposed concentric to said driveshaft is provided in synchronous rotary takeup relationship with said driveshaft, for performing end position recognition;

a countertakeup is concentric with and rotatable about an axis of rotation that is offset and parallel to an axis of rotation of said output shaft, whereby said takeup temporarily engages said countertakeup during each rotation of said takeup; and the rotary takeup movement of said countertakeup between the two end positions is no greater than 360°

End position recognition devices, such as those described above, can be mounted in a simple manner, e.g., by being retrofitted externally, onto the end of a drive unit, on the drive-shaft side. The drive unit, according to the invention, has an integrated emergency actuation feature so that the unit can be converted easily from manual emergency actuation to normal motor actuation, without the need for resetting the unit. The present invention further provides that a takeup and a countertakeup are mounted such that their axes of rotation are wobble-free relative to one another. Thus, the device provides an uncomplicated, simple-to-assemble and nevertheless functionally reliable reduction of the total stroke travel of the adjustable component driven by the output shaft to a maximum of one revolution of the countertakeup. The countertakeup is expediently designed as a ratchet wheel. Also, the driveshaft and the takeup can be formed as an integral unit. Moreover, in the case of manual emergency actuation, when the driveshaft is uncoupled from the transmission, the takeup is merely displaced axially by a small amount relative to the countertakeup, such that even when the driveshaft is displaced to its maximum axial stroke lift, the takeup nevertheless remains in contact with the countertakeup.

In addition, the coupling connection between the transmission and the driveshaft, which is preferably formed as a bevel wheel toothing between the output gear wheel and the driveshaft, ensures that there is a sufficient degree of axial overlap for effective torque transmission, yet at the same time needs only an axial stroke lift corresponding to the axial height of the tooth flanks of the bevel wheel toothing, in order to be decoupled. Thus the stroke lift is kept several times smaller than the stroke lift which is necessary in the conventional device disclosed in DE-C1-42 09 652, where the stroke lift is determined by the axial extent of the externally hexagonal;portion. The axial constructional space gained as a result thereby becomes available for mounting the end position recognition device axially, so that, on the whole, the overall height of the drive unit, according to the invention, even with end position recognition and emergency actuation features, does not have to be increased over conventional units. This is an important advantage because a small overall height is needed for drive units of this type, particularly when they are used for driving sliding roofs or windows in automobiles.

BRIEF DESCRIPTION OF THE DRAWINGS

The invention and further advantageous embodiments of the invention according to features of the dependent claims are explained in more detail below with reference to exemplary embodiments illustrated diagrammatically in the drawings in which:

DETAILED DESCRIPTION OF THE PREFERRED EMBODIMENTS

Figure 1:
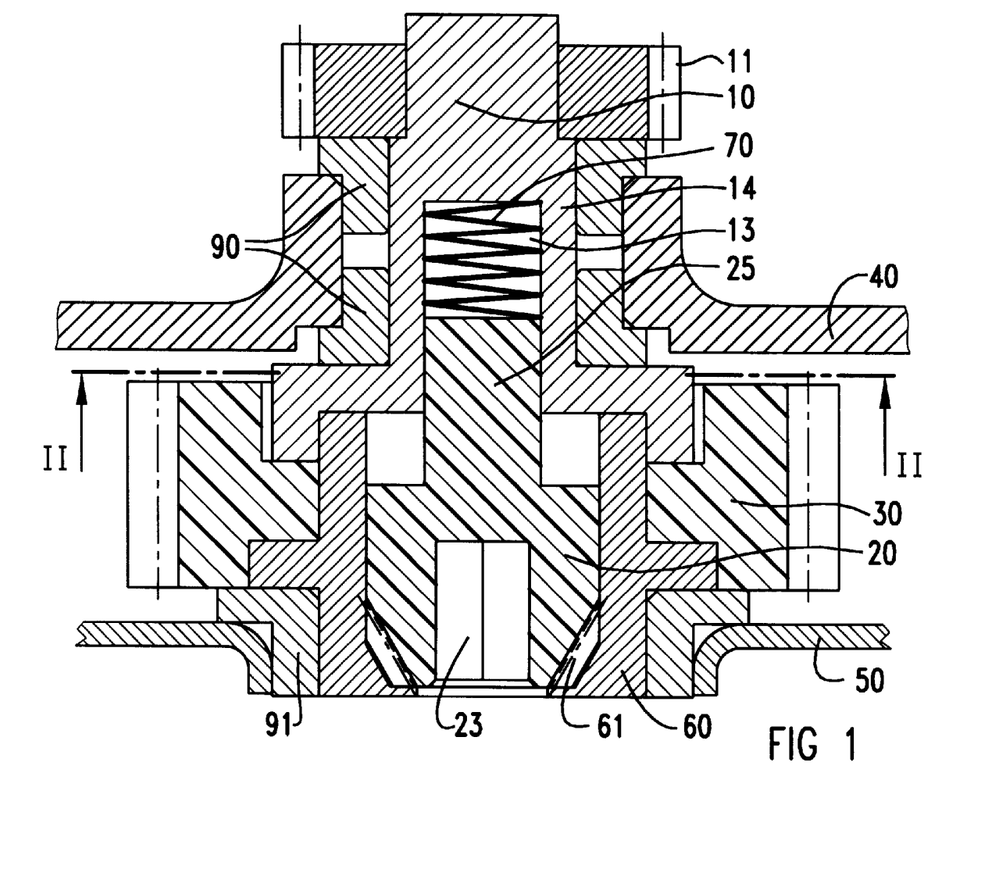
FIG. 1 shows an axial section through a first embodiment of a motor/transmission drive unit according to the invention in normal operation.
Figure 2:
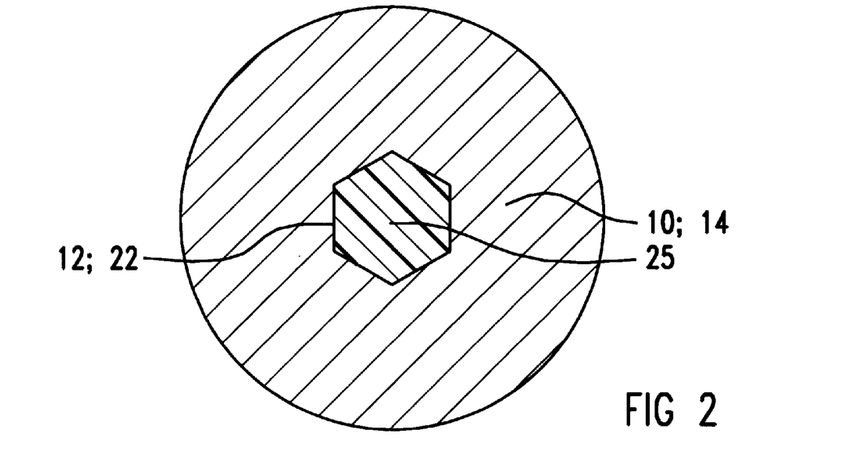
FIG. 2 shows the arrangement according to FIG. 1 along the sectional line II—II.
Figure 3:
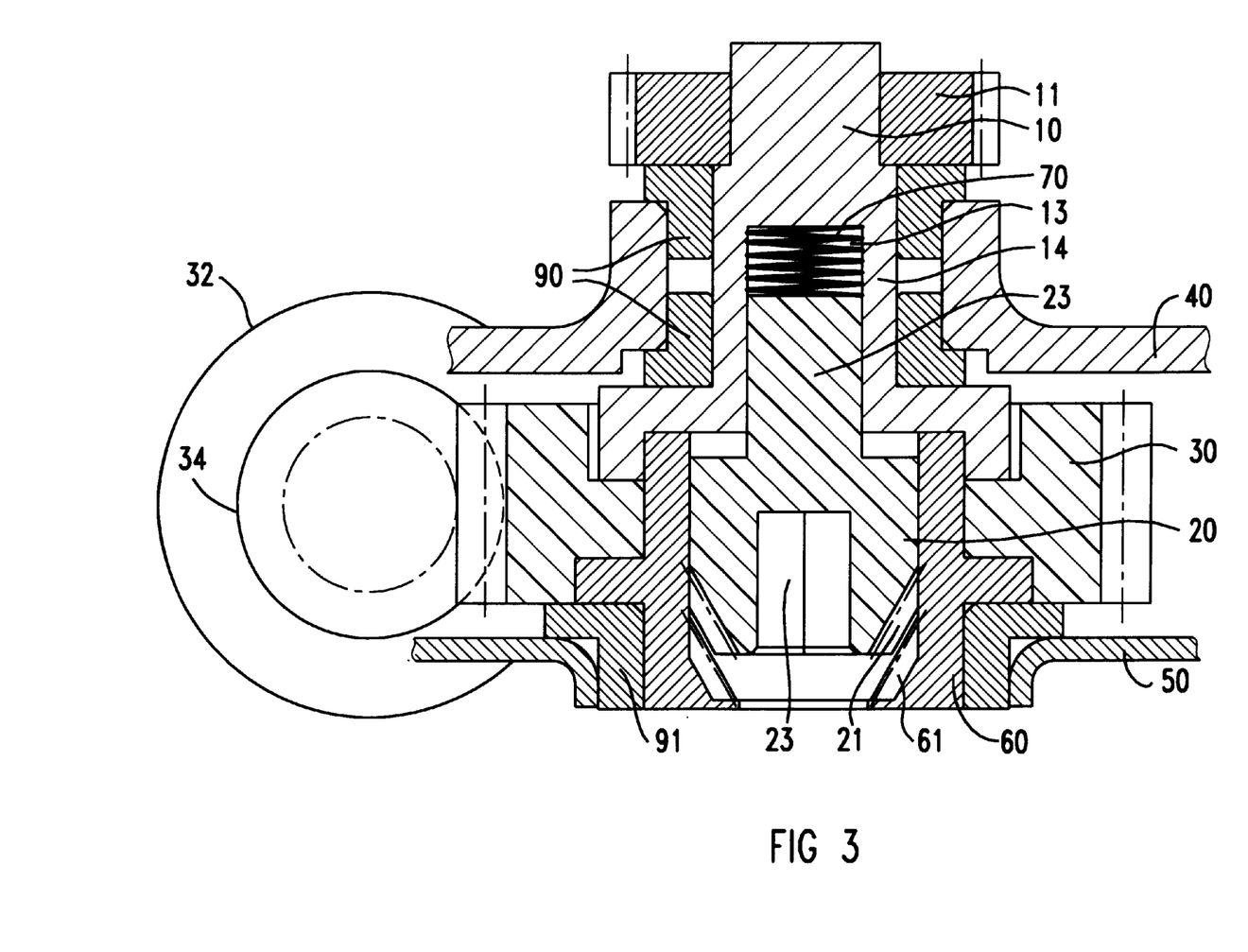
FIG. 3 shows the motor/transmission drive unit according to FIG. 1 in emergency actuation operation.

FIGS. 1 to 3 show a motor/transmission drive unit for driving a sliding roof in an automobile. The drive unit has a metallic transmission housing 40 and a metallic transmission housing cover 50 closing the housing 40. Mounted as main components on or in the transmission housing 40 or transmission housing cover 50 are a preferably metallic output shaft 10, with a likewise metallic output pinion 11, and a driveshaft 20 which is in rotary takeup with the output shaft 10 by means of an axially displaceable first coupling connection (12, 22), as well as an output gearwheel 30 of an electric motor 32 (see FIG. 3). The output pinion 11 is connected, e.g., to cables (not shown) that drive the adjustable component, such as an automobile's sliding roof, in a manner known in the art. The output gearwheel 30 driving the driveshaft 20 is illustrated in normal operation and is preferably injection-molded from plastic. The electric motor 32 drives the output gearwheel 30 e.g., by means of a wormshaft 34.

According to FIGS. 1 and 2, the axially displaceable coupling connection between the output shaft 10 and the driveshaft 20 is formed by a coupling sleeve 14 of the output shaft 10, engaging with positive rotary takeup around an axially projecting coupling pin 25 of the driveshaft 20, so that the coupling pin 25 reaches into an insertion orifice 13 of the output shaft 10. For this purpose, as is shown in the sectional diagram according to FIG. 2, a polygon interconnection with axially extending polygon faces 12 and 22 is provided respectively between the coupling pin 25 and the coupling sleeve 14. In the embodiment shown, the polygon is hexagonally shaped.

According to the invention, a releasable, second coupling connection is provided between the output gearwheel 30 and the driveshaft 20. This second coupling connection is preferably fashioned as a bevel wheel toothing with tooth flanks 21 of the driveshaft 20 running obliquely relative to the axis of the driveshaft 20 and located on the drive-shaft side. Corresponding tooth flanks 61 are provided on an intermediate coupling piece 60. According to FIGS. 1 and 2, the intermediate coupling piece 60 is fixedly connected to the output gearwheel 30, for example, through some form of mutual engagement, such as interlocking teeth or the like.

According to the exemplary embodiment shown in FIGS. 1 and 2, the intermediate coupling piece 60 is formed of metal and is mounted via a collar bearing 91 in the metallic transmission housing cover 50. In the exemplary embodiment according to FIGS. 4 and 5, the output gearwheel 30 of the transmission and the driveshaft 20 are advantageously produced as plastic injection moldings so that the intermediate coupling piece 60 can be omitted. Also, separate collar bearings can be dispensed with so that the driveshaft 20 can be radially widened, the degree of radial overlap of the tooth flanks can be increased and, as a result, their axial height and therefore the axial stroke lift for releasing the second coupling connection can advantageously be reduced even further. Accordingly, in an embodiment with a metallic intermediate coupling piece 60 according to FIGS. 1 to 3, a cone angle of approximately 60° is preferably provided. In the embodiment with a one-piece radially widened driveshaft 20 produced as a plastic injection molding and with direct drive by the output gearwheel 30 according to FIGS. 4 and 5, a cone angle of approximately 150° is preferably provided.

Figure 4:
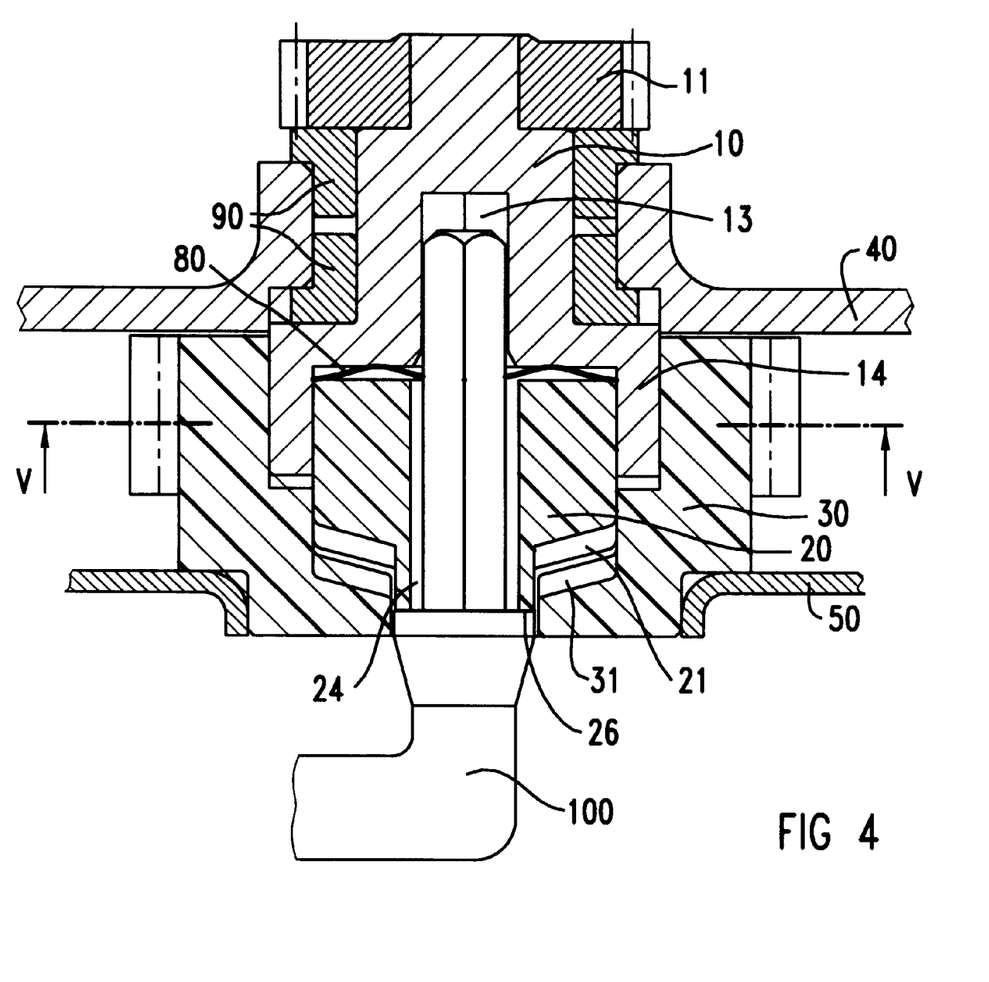
FIG. 4 shows a further embodiment of the invention in emergency actuation operation with an additionally inserted emergency actuation tool in the form of a crankhandle.
Figure 5:
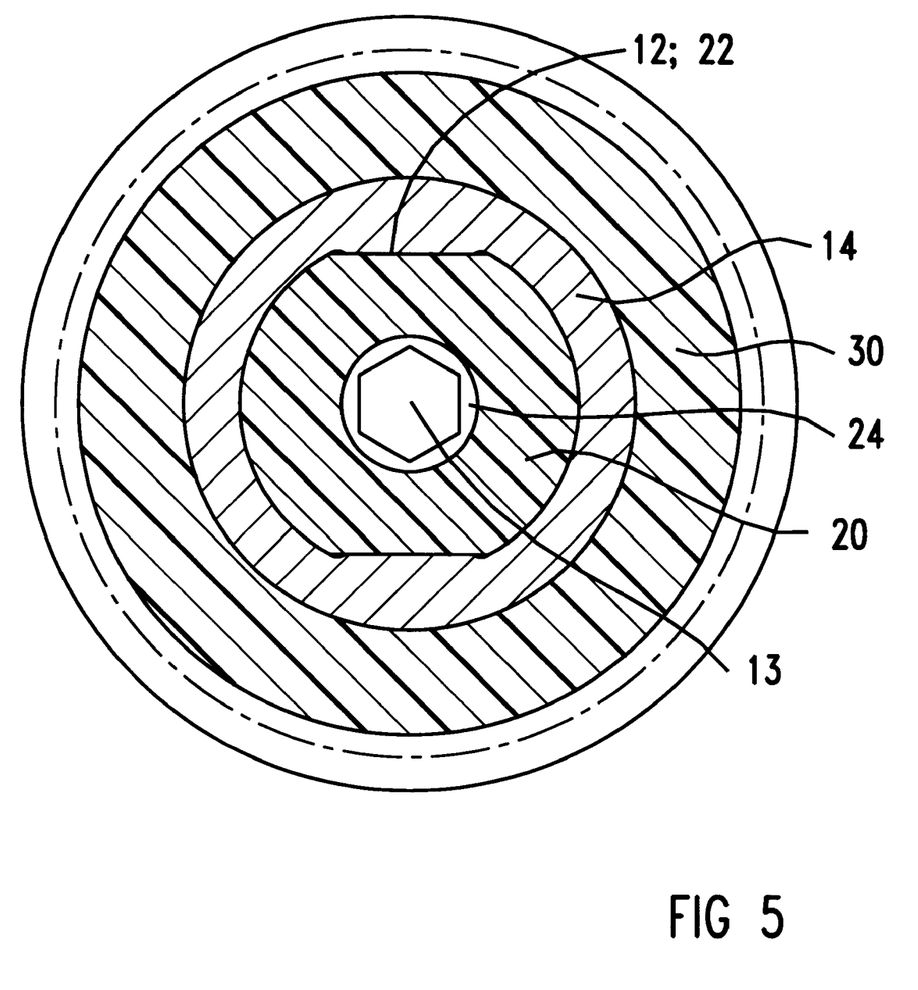
FIG. 5 shows the arrangement according to FIG. 4 along the sectional line V—V, but without an inserted crankhandle.

In the embodiment according to FIGS. 4 and 5, in an axially displaceable first coupling connection 12, 22 between the driveshaft 20 and the output shaft 10, the output shaft 10 engages over and around the outer edges of the driveshaft 20 by means of a coupling sleeve 14 integrated with the output shaft 10. The mutually corresponding faces 12 and 22 on the inner circumference of the coupling sleeve 14 of the output shaft 10 and on the outer circumference of the driveshaft 20 form a non-circular cross section, to provide for a positive, i.e. interlocking, mutual takeup.

In order to perform an emergency manual actuation in the case of the first exemplary embodiment, an emergency actuation tool, in particular a crankhandle 100 (not shown in FIGS. 1–3 for the sake of a clearer illustration of the other components) is introduced into the insertion orifice 23 of the driveshaft 20. When pressed axially forward by the crankhandle 100, the driveshaft 20 is raised axially counter to the pressure of a helical spring 70 according to FIGS. 1 and 3, until the coupling of the bevel wheel toothing is released. The insertion orifice 23 of the driveshaft 20 is shaped as an internal polygon, such that, by turning the crankhandle 100, which is provided with a corresponding external polygonal contour, it is possible to rotate the driveshaft 20 manually without there being a coupling connection to the output gearwheel 30. Due to the permanently connected axially displaceable first coupling connection 12, 22, the output shaft 10 together with its output pinion 11 rotate along with the driveshaft 20 when the crank handle 100 is turned. Consequently, the sliding roof can be adjusted independently of its motor drive.

In a second embodiment according to FIGS. 4 and 5, the output shaft 10 mounted in the transmission housing 40 via collar bearings 90 is made of metal. In such an arrangement, torque transmission can be increased by providing the injection molded driveshaft 20 with an axially continuous passage orifice 24, so that the free end of the polygon-shaped crankhandle 100 passes freely through the passage orifice 24 of the driveshaft 20. An axial abutment 26 is provided for axially uncoupling the driveshaft 20 from the output gearwheel 30 when the crankhandle is inserted positively in rotary takeup into the insertion orifice 13 of the output shaft 10. For mutual positive rotary takeup, the extended free end of the crankhandle 100 and the insertion orifice 13 of the output shaft 10 are provided with corresponding polygon faces.

In advantageous contrast to a helical spring as an axially bracing spring element, use of a spring ring disc 80, in particular a corrugated spring, with a middle orifice (see FIG. 4) makes it possible to introduce the crankhandle 100 easily into the insertion orifice 13 of the output shaft 10 while appreciably reducing the overall height of the spring element.

Figure 6:
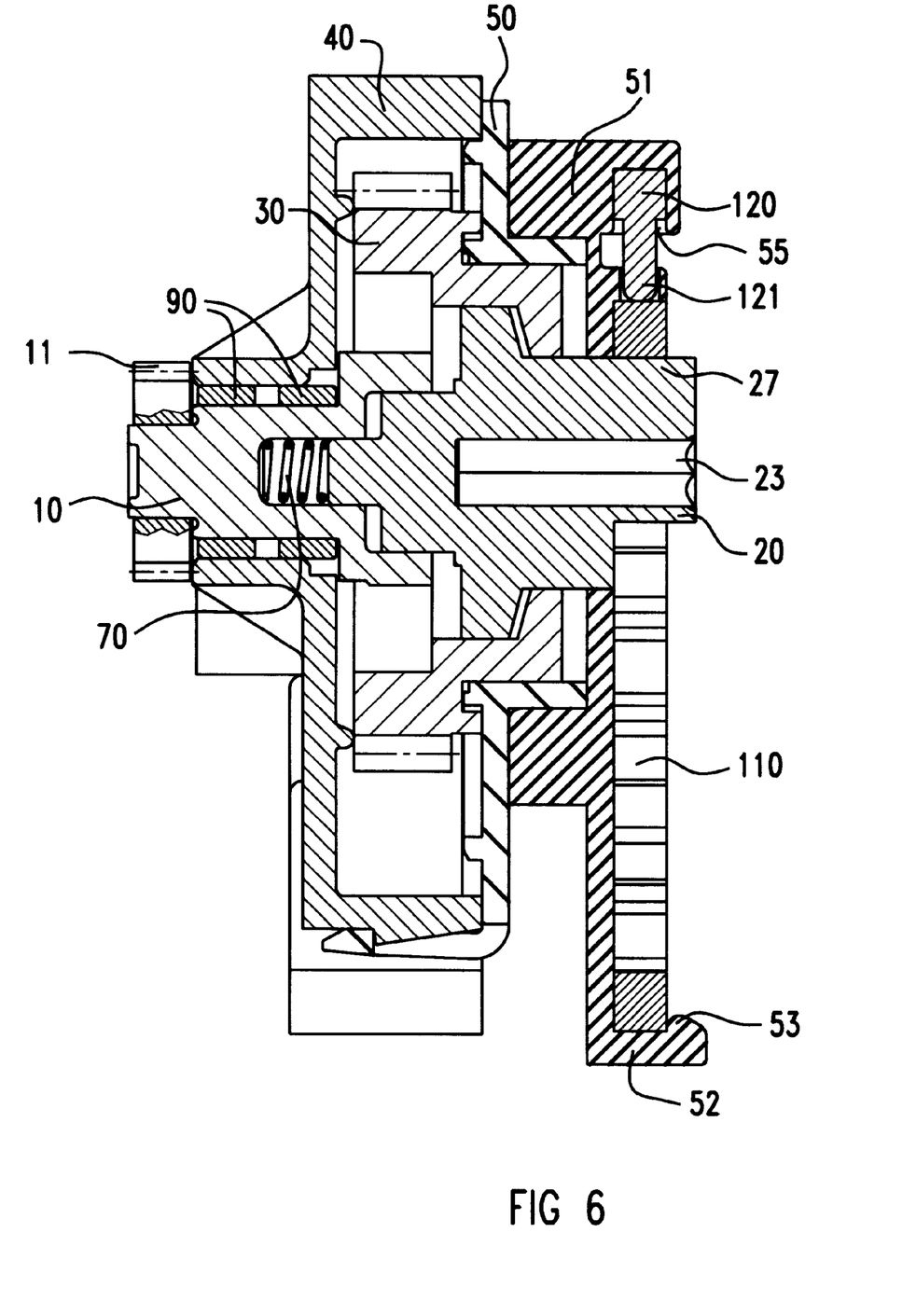
FIG. 6 shows an axial section along the sectional line VI—VI in FIG. 7 through an embodiment of a motor/transmission drive unit according to the invention provided with an end position recognition device.
Figure 7:
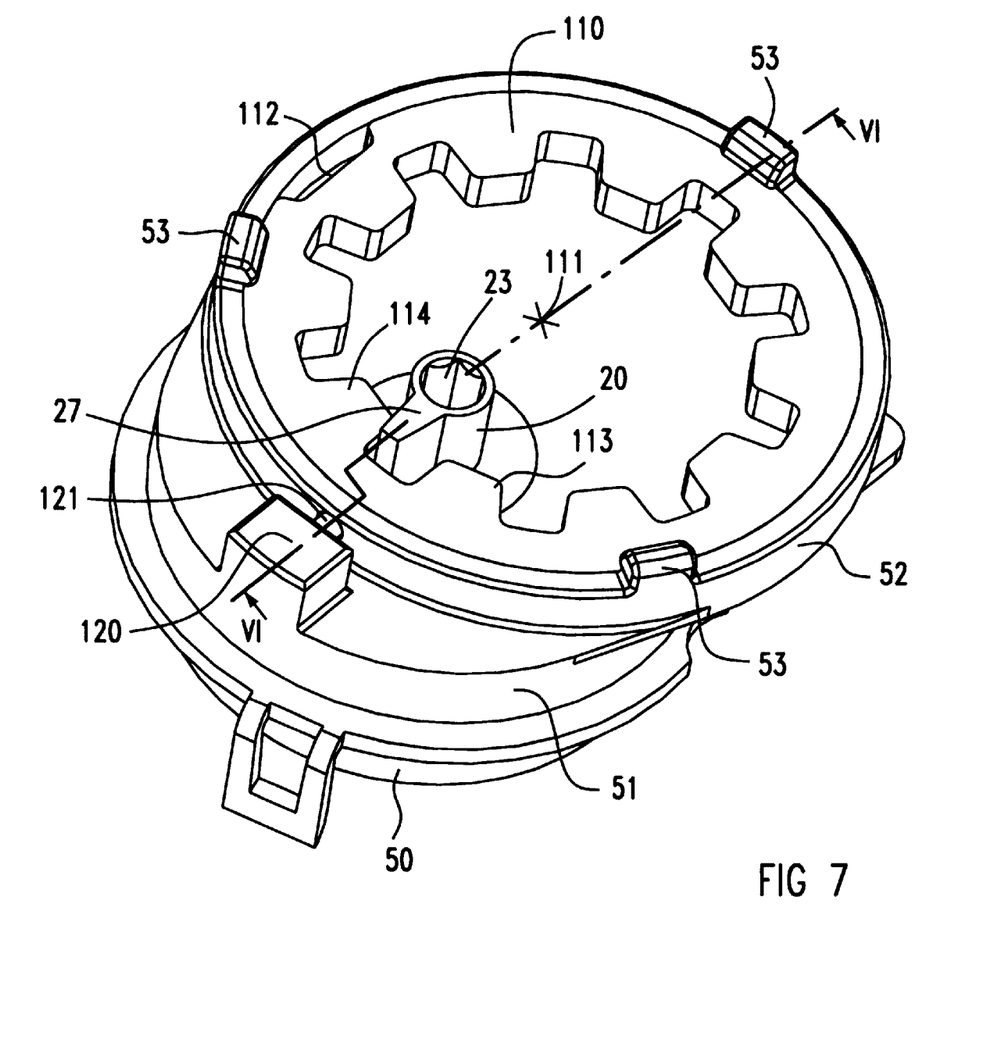
FIG. 7 shows a perspective axial top view of the end position recognition device according to FIG. 6.

FIGS. 6 and 7 show a motor transmission drive unit, provided with an end position recognition device, according to the present invention and its possible advantageous use in conjunction with the emergency actuation feature described with reference to FIGS. 1 to 5.

During or after adjustment by means of a manual emergency actuation operation, pre-defined positions of the adjustable component, which are e.g., stored in a control, are maintained. In other words, after termination of an emergency actuation operation and subsequent reactivation of the motor adjustment drive, the motor adjustment drive can be used fully again without having to be reset. In particular, it is not necessary to re-program or re-initialize the control data defining the end positions of the adjustable component.

More specifically, a takeup 27 in the form of a radially projecting cam is provided on the end of the driveshaft 20 which projects from the transmission housing cover 50, as shown in FIG. 6. Preferably, the takeup 27 is integrally formed in one piece with the driveshaft 20. The insertion orifice 23 is provided for emergency actuation as discussed above. A countertakeup 110 is provided in a holding device 51, which preferably fastens centrally onto the transmission housing cover 50. The countertakeup 110 is rotatable eccentrically parallel to the driveshaft 20 and can be acted on by the takeup 27. As best seen in FIG. 7, the countertakeup is preferably formed as a ratchet wheel having an internal toothing.

The countertakeup 110 is rotatably guided in the holding device 51, about an imaginary axis 111, which extends parallel to the driveshaft 20 and to the axis of rotation of the takeup 27. The countertakeup 110 is provided with teeth 113, 114, etc., forming the internal toothing. These teeth mesh with the takeup 27, such that, during each rotation of the takeup 27, the takeup 27 engages temporarily behind a tooth, takes this up and thereby rotates the countertakeup 110 as a whole by a certain corresponding fractional amount. Further rotations of the takeup 27 drive the countertakeup 110 by additional increments until the associated, pre-set end position is reached, whereby the circumferential angle between the two end position extremes of the adjustable component is no greater than 360°.

The takeup 27 advantageously has an axial stroke lift such that, in both axial displacement positions of the driveshaft 20, i.e., the positions corresponding to both normal operation and emergency actuation operation, the takeup 27 meshes with the countertakeup 110 whereby the takeup 27 positively engages the countertakeup 110 in both positions, as described above.

Advantageously in terms of manufacture, the countertakeup 110 can be assembled with the holding device 51, which is preferably manufactured as a plastic injection molding piece, by means of a press-in snap connection. The holding device 51 has an axially projecting cup-shaped edge 52, also serving as a rotatable guidance means for the countertakeup 110. Snap hooks 53 are formed on this edge 52 for axially securing the countertakeup 110.

The countertakeup 110 is advantageously designed as a ratchet wheel, and is provided at its outer edge with a switching slot 112, by which a switch 120, received in the holding device 51, is actuated. The switch 120, which may be used for switching the motor off and on, is actuated when a switching stud 121 of the switch 120, reaching through an orifice 55 of the cup-shaped edge 52, pushes forward into the slot 112 when the slot 112 is aligned with the orifice 55. In the case where only a single switch 120 is provided for marking the end positions, motor switch-off and motor switch-on are selectively assigned by means of a control arrangement. This arrangement may function by means of its software, for example as a function of a prior closing movement or prior opening movement of the component to be adjusted.

Figure 8:
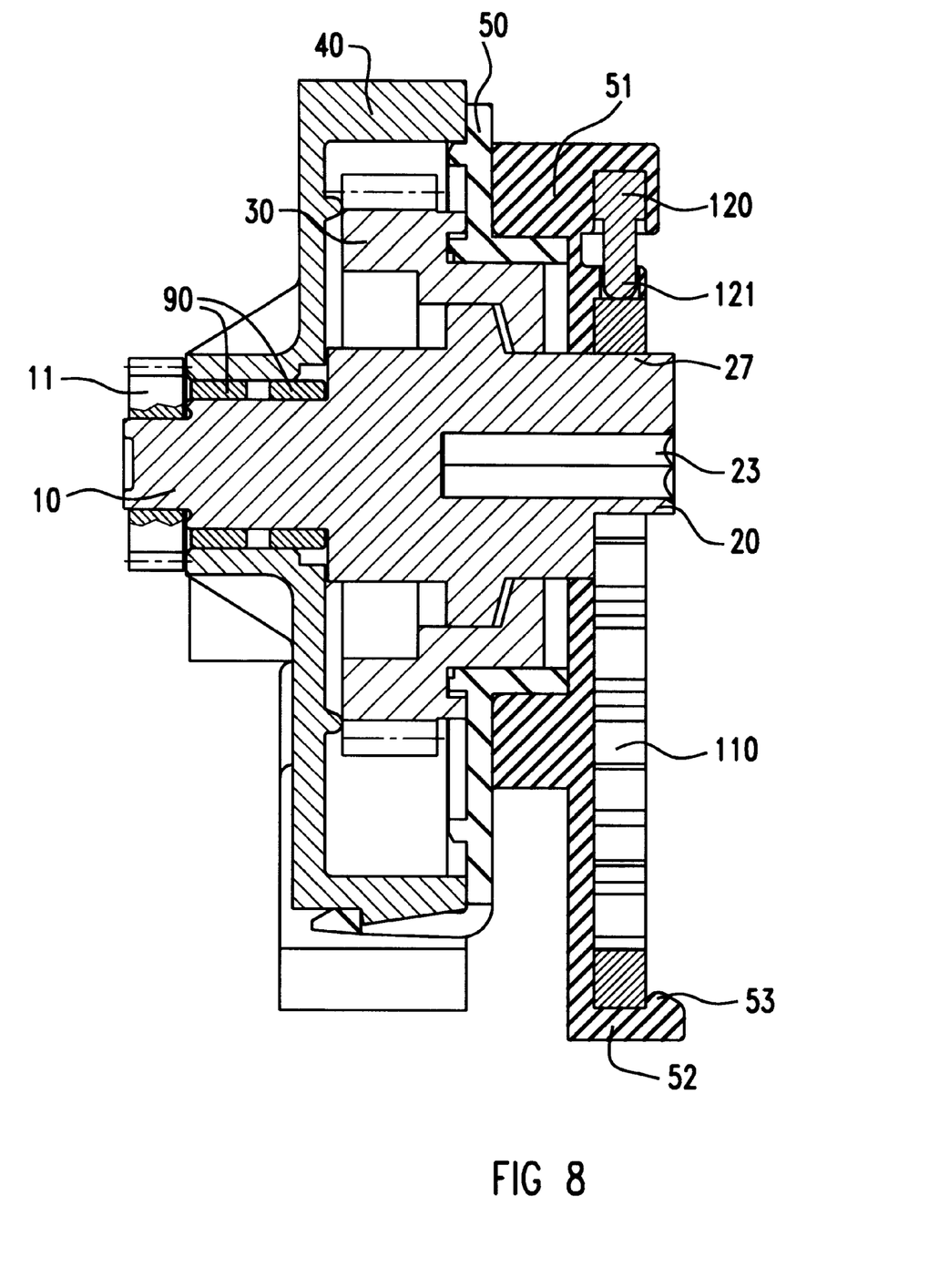
FIG. 8 shows an axial section through a further embodiment of a motor/transmission drive unit according to the invention provided with an end position recognition device, but without an emergency actuation capability.

FIG. 8 shows another exemplary embodiment of a motor/transmission drive unit according to the invention and provided with an end position recognition device but without an integrated emergency actuation capability. Like or equivalent components bear the same reference symbols as in the preceding Figures. In contrast to the exemplary embodiments illustrated in the previous Figures, there is no need for the output shaft 10 to move axially relative to the driveshaft 20 in the embodiment. Therefore, both can be made in one piece. The gearwheel 30 is connected nonpositively or positively to the driveshaft 20. As explained with reference to the above-mentioned exemplary embodiments, the end position recognition device can be retrofitted to the housing of the motor/transmission drive unit by means of an external coupling. Here as well, the countertakeup 110 is guided free of wobble relative to the output shaft 20 and to the takeup 27 mounted thereon. The countertakeup 110 is guided by means of the holding device 51 about an imaginary axis of rotation 111 which is parallel to and offset from the axis of rotation of the takeup 27.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. In a motor transmission drive unit for a component movable between two end positions, the motor transmission drive unit comprising an end position recognition device, wherein:

an electric motor is drive-connected to a reduction gear comprising at least one output shaft and one driveshaft;

a takeup is rotatable by said driveshaft and rotatable around a rotation axis of said driveshaft, for performing end position recognition;

a countertakeup is concentric with and rotatable about an axis of rotation that is offset and parallel to an axis of rotation of said driveshaft, whereby said takeup temporarily engages said countertakeup during each rotation of said takeup;

the rotary movement of said countertakeup between the two end positions is no greater than 360°;

said output shaft is connected with said driveshaft via a first coupling connection and is axially displaceable relative to said driveshaft;

said driveshaft is connected with an output gearwheel via a second coupling connection that uncouples by axial displacement of said driveshaft relative to said output gearwheel; and said second coupling connection comprises a bevel wheel toothing with meshing tooth flanks extending at an oblique angle relative to the rotation axis of said driveshaft.

2. The motor transmission drive unit according to claim 1, wherein said takeup is a radially projecting takeup cam on said driveshaft.

3. The motor transmission drive unit according to claim 2, wherein said takeup cam is integrally formed in one piece with said driveshaft.

4. The motor transmission drive unit according to claim 2, wherein said countertakeup is formed as an internally toothed outer wheel having a plurality of teeth, whereby said teeth are successively individually engaged by said takeup cam for successive rotations of said takeup.

5. The motor transmission drive unit according to claim 1, wherein said countertakeup is formed as a ratchet wheel with switch actuation means, wherein a switching slot is provided on an outer circumference of said countertakeup, for actuating at least one limit switch.

6. The motor transmission drive unit according to claim 1, wherein said drive unit comprises:

a transmission housing; and a holding device fastened to an external surface of said transmission housing, wherein said countertakeup and a limit switch are supported by said holding device;

wherein said driveshaft projects, with an end supporting said takeup, out of said transmission housing.

7. The motor transmission drive unit according to claim 6, wherein:

said transmission housing comprises a transmission housing cover covering said transmission housing on at least one side;

said holding device is fastened to an external surface of said transmission housing cover; and said driveshaft projects, with the end supporting said takeup, out of said transmission housing cover.

8. The motor transmission drive unit according to claim 6, wherein said holding device is formed as a plastic injection-molded component.

9. The motor transmission drive unit according to claim 7, wherein:

said holding device is fixed centrally to said transmission housing cover; and said countertakeup is rotatably supported eccentrically to said transmission housing cover.

10. The motor transmission drive unit according to claim 6, wherein:

said holding device comprises a cup-shaped edge; and during the rotary takeup movement, said countertakeup is guided circumferentially by the cup-shaped edge of said holding device.

11. The motor transmission drive unit according to claim 10, wherein said countertakeup is secured against substantial axial movement in at least one axial direction relative to the cup-shaped edge of said holding device by a plurality of axial press-in snap connections provided along the cup-shaped edge of said holding device.

12. The motor transmission drive unit according to claim 1, wherein said meshing tooth flanks are respectively provided on said driveshaft and said output gearwheel.

13. The motor transmission drive unit according to claim 1, wherein said second coupling connection comprises an intermediate coupling piece interposed between said driveshaft and said output gearwheel.

14. The motor transmission drive unit according to claim 1, wherein said tooth flanks of said second coupling connection are arranged at a cone angle of approximately 60°.

15. The motor transmission drive unit according to claim 12, wherein said tooth flanks of said second coupling connection are arranged at a cone angle of approximately 150°.

16. The motor transmission drive unit according to claim 1, wherein said axially displaceable, first coupling connection comprises:

a coupling pin formed on said driveshaft, wherein said coupling pin projects axially from and is coaxial with said driveshaft, and wherein said coupling pin has a non-circular cross section; and a coupling sleeve formed on said output shaft and defining an insertion orifice for receiving said coupling pin, wherein said coupling sleeve is coaxial with said output shaft and the insertion orifice has a non-circular cross section corresponding to the cross section of said coupling pin for interlocking with said coupling pin.

17. The motor transmission drive unit according to claim 16, wherein said non-circular cross section is a polygonal cross section.

18. The motor transmission drive unit according to claim 1, wherein said axially displaceable, first coupling connection comprises:

a periphery of said driveshaft that is non-circular in cross section; and a coupling sleeve formed on said output shaft and defining an insertion orifice for receiving said driveshaft, wherein said coupling sleeve is coaxial with said output shaft and interlocks with said driveshaft.

19. The motor transmission drive unit according to claim 1, wherein said output shaft and said driveshaft are braced axially relative to one another by means of a spring element.

20. The motor transmission drive unit according to claim 1, wherein said driveshaft has an axial emergency actuation insertion orifice shaped in depth and cross section to receive an emergency actuation tool that interlocks with the axial emergency actuation insertion orifice.

21. The motor transmission drive unit according to claim 20, wherein said emergency actuation tool is a crankhandle.

22. The motor transmission drive unit according to claim 1, wherein:

said driveshaft has a through-hole for passing a free end of an emergency actuation tool and has an axial abutment ledge for abutting a proximal end of the emergency actuation tool; and said output shaft has an insertion orifice shaped in depth and cross section for receiving the free end of said emergency actuation tool, to interlock with the insertion orifice of said output shaft.

23. The motor transmission drive unit according to claim 1, wherein said driveshaft and said output shaft are metal components.

24. The motor transmission drive unit according to claim 1, wherein said output gearwheel and said driveshaft are injection-molded plastic components and said output shaft is a metal component.

25. The motor transmission drive unit according to claim 1, wherein:

said takeup has an axial length greater than a maximum value of the axial displacement of said driveshaft relative to said output gearwheel for uncoupling the second coupling connection, whereby said takeup engages said countertakeup both when the second coupling connection is coupled and when the second coupling connection is fully uncoupled.

26. A drive unit for transferring a motive force from a motor to a component movable between two end positions, comprising:

a gear wheel for receiving the motive force from the motor, said gear wheel having an axis of rotation defined by a first imaginary axis;

a drive shaft rotatable by said gear wheel and having an axis of rotation defined by the first imaginary axis;

an output shaft for outputting the motive force to the component, said output shaft being rotatable by said drive shaft and having an axis of rotation defined by the first imaginary axis;

a takeup rotatable by said drive shaft and having an axis of rotation defined by the first imaginary axis; and an end position recognition device for recognizing the two end positions of the component, said device comprising a countertakeup having an axis of rotation defined by a second imaginary axis that is parallel to and radially offset from the first imaginary axis;

wherein said takeup actuates said countertakeup to rotate between first and second rotational positions that are maximally offset from one another by 360°;

wherein the first and second rotational positions of said countertakeup correspond respectively to the two end positions of the component; and wherein said drive shaft is connected with said near wheel via a coupling connection that comprises a bevel wheel toothing with meshing tooth flanks extending at an oblique angle relative to the rotation axis of said drive shaft.

27. The drive unit according to claim 26, wherein said takeup is coupled to said countertakeup such that each complete rotation of said takeup corresponds to a fraction of a rotation of said countertakeup.

28. The drive unit according to claim 26, wherein:

in a first axial position of said drive shaft relative to said gear wheel, said drive shaft is coupled to said gear wheel so as to rotate with said gear wheel;

in a second axial position of said drive shaft relative to said gear wheel, which is axially offset from the first axial position, said drive shaft is uncoupled from said gear wheel so as to rotate independently of said gear wheel; and said output shaft is coupled to said drive shaft so as to rotate with said drive shaft in both the first axial position and the second axial position of said drive shaft.

29. The drive unit according to claim 28, further comprising a spring interposed between said output shaft and said drive shaft for biasing said drive shaft in the first axial position.

30. The drive unit according to claim 26, wherein:

in a first axial position of said drive shaft relative to said gear wheel, said drive shaft is coupled to said gear wheel so as to rotate with said gear wheel;

in a second axial position of said drive shaft relative to said gear wheel, which is axially offset from the first axial position, said drive shaft is uncoupled from said gear wheel so as to rotate independently of said gear wheel; and said takeup is coupled to said countertakeup so as to actuate said countertakeup in both the first axial position and the second axial position of said drive shaft.

31. The drive unit according to claim 26, wherein:

said output shaft is connected with said drive shaft via an axially displaceable, further coupling connection.

32. A drive unit for transferring a motive force from a motor to a component movable between two end positions, comprising:

a gear wheel receiving the motive force from the motor, said gear wheel having an axis of rotation defined by a first imaginary axis;

a drive shaft rotatable by said gear wheel and having an axis of rotation defined by the first imaginary axis;

an output shaft outputting the motive force to the component, said output shaft being rotatable by said drive shaft and having an axis of rotation defined by the first imaginary axis;

a takeup rotatable by said drive shaft and having an axis of rotation defined by the first imaginary axis; and an end position recognition device recognizing the two end positions of the component, said device comprising a countertakeup having an axis of rotation defined by a second imaginary axis that is parallel to and offset from the first imaginary axis;

wherein said drive shaft is connected with said gear wheel via a coupling connection that comprises a bevel wheel toothing with meshing tooth flanks extending at an oblique angle relative to the rotation axis of said drive shaft.

* * * * *